Feb. 21, 1933.  R. L. R. WILD  1,898,025
FRICTION MATERIAL
Filed Feb. 24, 1930
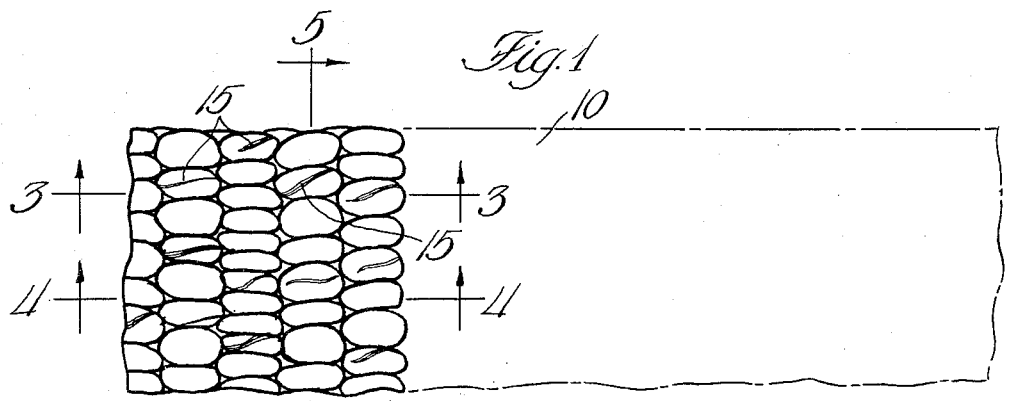
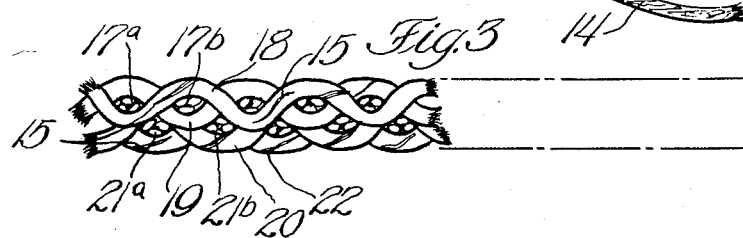
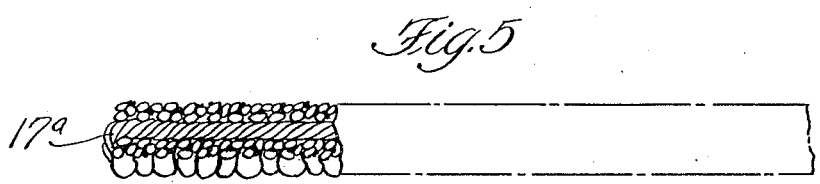
Inventor:
Rudolf L. R. Wild
By Williams, Bradbury, McCaleb & Hinkle
Attys.

Patented Feb. 21, 1933

1,898,025

UNITED STATES PATENT OFFICE

RUDOLF L. R. WILD, OF CHICAGO, ILLINOIS, ASSIGNOR TO UNION ASBESTOS & RUBBER COMPANY, OF CHICAGO, ILLINOIS, A CORPORATION OF ILLINOIS

FRICTION MATERIAL

Application filed February 24, 1930. Serial No. 430,554.

The present invention relates to friction materials, and is particularly concerned with materials adapted to be used for brake linings, clutch facings and the like.

Among the salient objects sought to be accomplished by a friction material of the present type, are the following:

1. The provision of a friction material which will not score the drums or other metallic surfaces with which it is used, or a substantial reduction in the amount of scoring as compared with the devices of the prior art.

2. The actual improvement of the characteristics of the surface of the drum or other metallic surface with the use of the friction material, such as the coating of the drum surface, filling the pores and polishing the drum.

3. The prevention of the fusion of the tiny particles of steel or other particles, as, for instance, under the extreme heat produced by excessive or prolonged braking, to eliminate the formation of solid pieces of steel or other materials which might score the drum.

4. The provision of a friction material which has a uniform co-efficient of friction under the various different conditions of pressure and temperature to which it is likely to be subjected, such as a lining which does not change its characteristics during excessive braking, so as not to grab nor slip under extreme temperature and pressure.

5. The provision of a friction material which has a greater wear resistance than the materials of the prior art, thereby giving a longer service with cheaper maintenance and less repair, as, for instance, brake service over longer periods of time, without adjustment or relining.

6. The provision of a friction material which may be economically made of uniform thickness and uniform characteristics over the entire area of the material, so as to give a uniform clearance about a brake drum, uniform contact and uniform wear to maintain the uniformity of clearance and braking contact.

7. The provision of a friction material which may be economically manufactured and installed, which eliminates or substantially reduces squealing of brakes, which is substantially noiseless, which does not grab nor slip, which does not produce vibration and which does not change its characteristics with wear nor in wet weather.

The materials constructed according to the present invention have shown a substantial improvement in most of the desirable characteristics before mentioned, and have given satisfactory performance with respect to the other requirements of a friction material such as a brake lining.

The primary object of the present invention is the provision of an improved friction material for brake lining or the like, which has improved operating characteristics.

Other objects and advantages of the invention will be apparent from the following description and from the accompanying drawing, in which similar characters of reference indicate similar parts throughout the several views.

Referring to the single sheet of drawing;

Fig. 1 is a plan view of a portion of the friction material which is usually manufactured in the form of a band of definite width, but may be constructed in pieces of any size.

Fig. 2 is an enlarged side elevational view of one of the threads, warp, binder or filler which may be used in weaving the material.

Fig. 3 is a sectional view taken on the plane of the line 3—3 of Fig. 1, transversely to the filler threads, showing the relation between the threads, and showing the course of the warp threads in a 2-ply piece of fabric.

Fig. 4 is a similar sectional view taken on the plane of the line 4—4, looking in the direction of the arrows, showing the course of a binder thread and showing filler threads in section.

Fig. 5 is a sectional view taken on the plane of the line 5—5 of Fig. 1, looking in the direction of the arrows, showing the course of a filler thread with the warp and binder threads in section.

One of the most important features of the present invention consists in the incorporation of metallic zinc or an alloy, in which the properties of this material are retained, in a friction material for the purpose of improving the braking characteristics of the friction material.

The embodiment which has been chosen to illustrate the invention consists of a woven fabric lining, but it should be understood that the invention is not limited to the woven type of lining and may be incorporated in any of the conventional types of brake lining or clutch facing, and the present construction is to be regarded as exemplary of but one of the forms of the invention. The term "zinc" as used in the accompanying specification and claims, is hereby defined to include not only the pure element but any alloy thereof in which there are retained the properties of this element which are necessary or desirable in the improvement of the characteristics of a brake lining. One example of the zinc wire which may be used to construct brake linings of the present type is the wire which is known by the name of Special Electrolytic Zinc Wire, and which may be purchased on the open market from Hudson Wire Co., of Ossining, New York. The latter type of wire has an increased tensile strength over ordinary zinc wire and may therefore be made finer, while still retaining the necessary tensile strength. Wire which includes metal manufactured or treated electrolytically is also chemically pure and does not include the impurities which were present in the ordinary metal wires used in the friction materials of the prior art, and new and useful results are achieved by such chemically pure wire over the devices of the prior art.

Referring to Fig. 2, the thread illustrated in this figure is exemplary of one of the types of threads which may be used for either the warp, filler or binder threads, but it should also be understood that any number of twisted strands may be used and the location, number, and arrangement of the zinc wires, copper reinforcing wires or asbestos strands may be varied infinitely, while still coming within the scope of the present invention.

It is highly desirable that in the finished lining shown in Fig. 1, the zinc which has been incorporated in the lining 10 be exposed at the surface of that side of the lining which is intended to engage the brake drum or other cooperating metallic surface. For this purpose the zinc wires are preferably included in some of the threads which are exposed at one surface of the lining 10, but it will be understood that in some embodiments of the invention the zinc may be initially covered by parts of the lining to be exposed as soon as the lining has been worn down the desired amount by ordinary wear, by grinding down the surface or by other modes of finishing the brake lining and drum.

It will thus be evident that the zinc wires are not always necessarily included in the outer threads of the woven fabric, but in some cases the zinc wires may be included in the filler threads, in other cases in the warp threads, in other cases in the binder threads or the specific arrangement may be one of the combinations or permutations of the foregoing.

Referring to Fig. 2, the separate strands of the thread 11 have been indicated by the numerals 12, 13 and 14, and these strands are preferably formed of fibers of asbestos or chrysotile. A relatively small amount of cotton or other vegetable fiber is included with the asbestos fibers and intermingled among the asbestos fibers for the purpose of giving the twisted strands greater tensile strength, and the amount of cotton which is used depends upon the grade of asbestos fabric which is to be manufactured, as well as the length of the respective asbestos fibers. That is, a long fiber asbestos does not need so much cotton and the cheaper grades of lining usually include a larger percentage of cotton or other vegetable fiber for the reason that the asbestos is more expensive.

The preferred form of the lining includes only a small percentage of cotton or so much as is necessary to give it the desired tensile strength. Any form of conventional twist may be given to the strands 12—14 or threads 11, but ordinarily the fibers in the threads 12—14 are twisted in one direction and the threads themselves are twisted in the opposite direction. In some cases, the threads and strands may be twisted all in the same direction, but the former arrangement provides a greater tensile strength.

The threads 11 each preferably include one or more wires 15, 16 for the purpose of increasing the tensile strength or incorporating the metallic zinc in the lining, or both. The usual method of increasing the tensile strength of a lining is through the incorporation of reinforcing wires of non-corrodible metal, such as fine brass wires, and if desired, a number of brass wires may be supplied in addition to the zinc wires 15 or 16 at such portions of the lining as require a greater tensile strength. Since the filler threads 17 are not exposed until a considerable amount of wear has taken place, brass wires may be used in the filler threads instead of zinc wires, or several different types of warp threads 18, 19, 20 may be employed so long as the zinc which is incorporated in the material is exposed at the surface of an operative lining, and the present invention is not confined to the type of lining in which zinc is incorporated in every thread.

When the threads 12, 13, 14 and the wires 15, 16 are twisted together as shown at the left in Fig. 2, the zinc wires are ordinarily exposed at a plurality of points 15 on the surface of the thread, the points of exposure occurring at random and referring to Fig. 1, it will be observed that the zinc 15 also appears at a number of points throughout the surface of the material 10. The distribution of the zinc throughout the friction material is preferably made as uniform as possible for the purpose of obtaining uniformity in the action of the zinc, uniformity of wear and uniformity of the braking characteristics over the entire area of the material. This result is accomplished by the intermingling of the strands of zinc with the strands of asbestos in the thread, but if desired, other forms of interweaving the zinc among the asbestos threads may be employed, such as, for instance, the substitution of flexible zinc threads including a plurality of strands, for any one of the other threads of the fabric, such as warp, filler or binder threads, in which case the balance of the threads may consist of ordinary asbestos threads.

For the sake of uniformity in the manufacture of the lining, all of the asbestos threads may include one or more zinc wires, although the zinc which is used in the lowermost portions of the lining, such as warp threads 20 or filler threads 21, may never come in contact with a brake drum. The manufacture of the lining is greatly simplified by the use of a single type of material for the thread and both sides of the lining are thereby made capable of being applied to the brake drum.

In other embodiments of the invention, the asbestos threads may include one zinc wire and one copper wire or two zinc wires together with such an additional number of copper wires as may be deemed desirable to give the requisite tensional strength to the thread, and I do not wish to limit myself to the specific arrangement in which all of the wires are zinc.

Referring to Fig. 5, it will be observed that the filler threads 17 may consist of one continuous thread of material which proceeds from side to side of the fabric or band to form a woven friction lining which has a finished edge. Thus, in the single ply lining the filler 17a (Fig. 3) proceeds across the fabric and returns as the filler 17b, and so forth. In the specific embodiment illustrated, which consists of a 2-ply lining, the filler 17a proceeds across the fabric and returns in the lower ply as the filler 21a, after which it proceeds across the fabric again as the filler 17b, and so forth.

The embodiment illustrated consists of a 2-ply lining, and consequently each set of filler threads 17 has a corresponding series of warp threads 18, 19 interwoven with it. Thus, the warp thread 18 passes under filler thread 17a over the filler 17b and so forth, longitudinally of the fabric, while the warp thread 19 passes over the filler 17a under the filler 17b and so forth, longitudinally of the fabric. The warp threads 20 and 22, which form the lower ply, together with the filler threads 21 bear the same relation to each other and to the filler threads 21a, 21b, etc., as has been described with respect to the threads of the other ply.

Referring to Fig. 4, one of the binder threads 23 is illustrated in this figure, and it will be observed that the binder thread 23 passes alternately about the filler threads in the respective plies or layers. Thus, the binder thread 23 passes over the filler thread 17a in the top ply, under the filler thread 21a in the lower ply, over filler thread 17b in the upper ply, and so forth. The binder threads 23 thus pull and secure the two plies of fabric together, and give the friction material the desired thickness of body.

In order to hold the edges of the plies of fabric together, the outermost longitudinal thread in the fabric is usually one of the binder threads 23, and the binder threads 23 occur at regularly spaced lines longitudinally of the fabric. The number of binder threads employed depends upon the results desired, but in the present embodiment, four ordinary warp threads are used for each binder thread, which means that proceeding transversely across the surface of the fabric, there will be found one binder thread, two warp threads, then one binder thread, and so forth. The present portion of binder and warp threads is, however, merely exemplary of one of the forms of weave which may be employed.

Any number of plies of fabric may be used, and in the thicker brake linings, 3-ply, 5-ply and even thicker linings may be made by merely adding additional layers of fabric of the type shown in Fig. 3, and binding them all together with binders as shown in Fig. 4.

It should also be understood that the present invention may be embodied in any of the conventional forms of weaving and the specific type of weave which has been described in detail merely consists of the preferred form which is exemplary of one of the forms of weaving which may be used.

After the fabric has been woven, as described, and stretched so that the various threads are closely and compactly interwoven and strained against each other, the friction material is thoroughly dried out and impregnated with a saturating compound, which may consist of a mixture of bituminous material, such as gilsonite and other natural and petroleum asphalts, with drying pinches and resins, such as, linseed, Chinawood oil, stearine, pinch, cottonseed pitch, animal pitch, etc., thinned to the required consistency with coal tar or petroleum solvent.

The impregnated fabric is also subjected to heat and pressure for drying out excess material, compacting the fibers, and giving the friction material a substantially uniform thickness.

It will thus be observed that when the lining is constructed according to the foregoing description, the metallic zinc wires which may be of pure zinc or zinc alloy as before mentioned, are uniformly distributed throughout the body of the fabric and the zinc appears at the surface for engagement with the brake drum or other metallic cooperating surface. The present lining is particularly adapted to be used with pressed steel brake drums, and is adapted to effect a substantial degree of improvement in the desirable characteristics which have already been mentioned.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A friction material comprising asbestos fibers felted together and a plurality of electrolytic zinc bodies carried between said fibers and exposed at the surface of said material.

2. A friction resistive material, comprising a woven fabric having a plurality of warp threads of asbestos strands, filler threads of asbestos fibers interengaging said warp threads forming a woven fabric, and electrolytic zinc carried by said woven fabric and exposed at the surface of said fabric at a plurality of points.

3. A friction resistive material, comprising a woven fabric having a plurality of warp threads of asbestos strands, filler threads of asbestos fibers interengaging said warp threads forming a woven fabric, and electrolytic zinc carried by said woven fabric and exposed at the surface of said fabric at a plurality of points, said zinc comprising wires interwoven among the threads of asbestos.

4. A friction resistive material, comprising a woven fabric having a plurality of warp threads of asbestos strands, filler threads of asbestos fibers interengaging said warp threads forming a woven fabric, and electrolytic zinc carried by said woven fabric and exposed at the surface of said fabric at a plurality of points, said zinc comprising wires twisted in with the strands of certain of the threads of said fabric.

5. A friction resistive material, comprising a woven fabric having a plurality of warp threads of asbestos strands, filler threads of asbestos fibers interengaging said warp threads and forming a plurality of plies of woven fabric, a plurality of binder threads engaging filler threads in different plies of said material and binding said plies together, and wires including electrolytic zinc interwoven in said fabric, with certain of said threads, and exposed at the friction surface of said fabric.

6. The herein described woven friction fabric having electrolytic zinc incorporated in and distributed therethrough.

7. The herein described friction material comprising fibrous material including asbestos and electrolytic zinc incorporated therein, and distributed substantially uniformly therethrough.

8. In a friction material, a fibrous friction material including asbestos fibers and a multiplicity of bodies of electrolytic soft metal uniformly distributed throughout said friction material and exposed at the surface thereof.

9. A friction resistive material comprising a body of asbestos fibers, an impregnating composition carried by said asbestos fibers and giving said friction resistive material a predetermined form, frictional and wear resistive qualities, and electrolytic metallic zinc distributed throughout said friction resistive material, and disposed at the surface thereof to improve the friction characteristics of said material and prevent scoring of metallic members with which said friction resistive material is used.

In witness whereof, I hereunto subscribe my name this 14th day of February, 1930.

RUDOLF L. R. WILD.